(12) United States Patent
Belotserkovsky

(10) Patent No.: US 8,582,685 B2
(45) Date of Patent: Nov. 12, 2013

(54) APPARATUS AND METHOD FOR ENCODING A SIGNAL

(75) Inventor: Maxim Belotserkovsky, Hamilton, IN (US)

(73) Assignee: Thomson Licensing, Issy-les-Moulineaux (FR)

(*) Notice: Subject to any disclaimer, the term of this patent is extended or adjusted under 35 U.S.C. 154(b) by 81 days.

(21) Appl. No.: 13/263,769

(22) PCT Filed: Apr. 13, 2010

(86) PCT No.: PCT/US2010/030835
§ 371 (c)(1),
(2), (4) Date: Oct. 10, 2011

(87) PCT Pub. No.: WO2010/120735
PCT Pub. Date: Oct. 21, 2010

(65) Prior Publication Data
US 2012/0027122 A1    Feb. 2, 2012

Related U.S. Application Data

(60) Provisional application No. 61/169,851, filed on Apr. 16, 2009.

(51) Int. Cl.
*H04L 27/00* (2006.01)

(52) U.S. Cl.
USPC ........... 375/295; 375/265; 375/296; 370/328; 370/470

(58) Field of Classification Search
USPC ................. 375/295, 340, 240, 316, 265, 296; 370/328, 470
See application file for complete search history.

(56) References Cited

U.S. PATENT DOCUMENTS

| 7,885,358 B2* | 2/2011 | Kim et al. ..................... 375/316 |
| 7,907,635 B2* | 3/2011 | Kim et al. ..................... 370/487 |

(Continued)

FOREIGN PATENT DOCUMENTS

| WO | WO 2007/061244 | 5/2007 |
| WO | WO 2007/100186 | 9/2007 |

OTHER PUBLICATIONS

Eui Jun Park, et al. "Supplementary Reference Sequence VSB System;" Consumer Electronics, 2007 ICCE 2007 Conference on IEEE, PI, Jan. 1, 2007. ICCE 2007 Digest of Technical Papers. International Conference on, IEEE, PI, Jan. 1, 2007 pp. 1-2 XP031071441.

(Continued)

*Primary Examiner* — Daniel Washburn
*Assistant Examiner* — Berhanu Tadese
(74) *Attorney, Agent, or Firm* — Robert D. Shedd; Vincent E. Duffy; Michael A. Pugel

(57) ABSTRACT

An apparatus and method for encoding a signal are provided. The apparatus and method of the present disclosure identify the various portions, or bytes, of an incoming packet in a Reed-Solomon (RS) encoded packet as either data bytes, RS parity bytes, or trellis reset synchronization bytes. The data bytes are passed through without change. The trellis reset bytes are provided to a trellis encoder to determine new byte reset values. These new values are then stored and later retrieved when needed and used to modify the appropriate incoming parity bytes. The new incoming parity bytes are computed using the new trellis reset byte values multiplied by, or added to, a weighting value retrieved from a table stored in memory based on a location of the parity byte and a location of the trellis reset byte in the RS encoded packet.

19 Claims, 4 Drawing Sheets

(56) References Cited

U.S. PATENT DOCUMENTS

| | | | |
|---|---|---|---|
| 7,934,243 B2* | 4/2011 | Song et al. | 725/116 |
| 7,983,354 B2* | 7/2011 | Park et al. | 375/268 |
| 7,986,715 B2* | 7/2011 | Song et al. | 370/470 |
| 8,098,741 B2* | 1/2012 | Suh et al. | 375/240.27 |
| 8,315,334 B2* | 11/2012 | Kim et al. | 375/295 |
| 8,320,501 B2* | 11/2012 | Park et al. | 375/316 |
| 8,374,252 B2* | 2/2013 | Song et al. | 375/240.25 |
| 2003/0099303 A1* | 5/2003 | Birru et al. | 375/265 |
| 2004/0237024 A1* | 11/2004 | Limberg | 714/784 |
| 2006/0262863 A1* | 11/2006 | Park et al. | 375/240.26 |
| 2007/0071110 A1* | 3/2007 | Choi et al. | 375/240.27 |
| 2007/0081605 A1* | 4/2007 | Choi | 375/265 |
| 2007/0092027 A1* | 4/2007 | Yu et al. | 375/295 |
| 2007/0133672 A1* | 6/2007 | Lee et al. | 375/233 |
| 2007/0230460 A1* | 10/2007 | Jeong et al. | 370/389 |
| 2007/0268979 A1* | 11/2007 | Chang et al. | 375/265 |
| 2008/0019466 A1* | 1/2008 | Limberg | 375/346 |
| 2008/0130776 A1* | 6/2008 | Park et al. | 375/265 |
| 2009/0046815 A1* | 2/2009 | Oh et al. | 375/340 |
| 2009/0060051 A1 | 3/2009 | Song et al. | |
| 2010/0061476 A1* | 3/2010 | Kim et al. | 375/265 |
| 2011/0164561 A1* | 7/2011 | Song et al. | 370/328 |
| 2011/0228876 A1* | 9/2011 | Song et al. | 375/295 |
| 2012/0106675 A1* | 5/2012 | Song et al. | 375/296 |
| 2012/0114070 A1* | 5/2012 | Choi et al. | 375/295 |
| 2012/0192241 A1* | 7/2012 | Cho et al. | 725/116 |

OTHER PUBLICATIONS

Search Report dtd Jul. 29, 2010.

* cited by examiner

APPARATUS AND METHOD FOR ENCODING A SIGNAL

REFERENCE TO RELATED PROVISIONAL APPLICATION

This application claims the benefit under 35 U.S.C. §365 of International Application PCT/US2010/030835 filed Apr. 13, 2010, published in accordance with PCT article 21(2) on Oct. 21, 2010, which claims the benefit under 35 U.S.C. §119 of provisional application 61/169,851 filed in the United States on Apr. 16, 2009.

TECHNICAL FIELD OF THE INVENTION

The present disclosure generally relates to broadcast systems and signal processing, and more particularly, to an apparatus and method for encoding a signal to compensate for a trellis state reset condition.

BACKGROUND OF THE INVENTION

Television broadcast systems throughout the world have migrated from the delivery of analog audio and video signals to modern digital communications systems. For example, in the United States, the Advanced Television Standards Committee (ATSC) has developed a standard called "ATSC Standard: Digital Television Standard A/53" (the A53 standard). The A53 standard defines how data for digital television broadcasts should be encoded and decoded. In addition, the U.S. Federal Communications Commission (FCC) has allocated portions of the electromagnetic spectrum for television broadcasts. The FCC assigns a contiguous 6 MHz channel within the allocated portion to a broadcaster for transmission of terrestrial (i.e., not cable or satellite) digital television broadcasts. Each 6 MHz channel has a channel capacity of approximately 19 Mb/second based on the encoding and modulation format in the A53 standard. Furthermore, the FCC has mandated that transmissions of terrestrial digital television data through the 6 MHz channel must comply with the A53 standard.

Digital broadcast signal transmission standards, such as the A53 standard, define how source data (e.g., digital audio and video data) should be processed and modulated into a signal that is transmitted through the channel. The processing adds redundant information to the source data so that a receiver that receives the signal from the channel may recover the source data, even if the channel adds noise and multi-path interference to the transmitted signal. The redundant information added to the source data reduces the effective data rate at which the source data is transmitted but increases the potential for successful recovery of the source data from the transmitted signal.

The A53 standard development process was focused on high definition television (HDTV) and fixed reception. The system was designed to maximize video bit rate for the large high resolution television screens that were already beginning to enter the market. Transmissions broadcast under the ATSC A/53 standard, or legacy encoding and transmission standard, present difficulties for mobile receivers.

Recognizing this fact, in 2007, the ATSC announced the launch of a process to develop a standard that would enable broadcasters to deliver television content and data to mobile and handheld devices via their digital broadcast signal, commonly known as ATSC M/H. Changes to the legacy transmission standard include an additional encoding scheme to introduce further data redundancy. The additional encoding has been adapted to better perform with advanced receivers in mobile, handheld and pedestrian devices while still remaining backward compatible with the legacy A53 standard. The proposed changes also allow operation of existing ATSC services in the same radio frequency (RF) channel without an adverse impact on existing receiving equipment.

Referring to FIG. 1, an exemplary ATSC broadcast system 10 including a standard (TS Main) system 12, i.e., existing or legacy system, and M/H (mobile/handheld) system 14 is illustrated. Each system 12, 14 feeds a M/H framing or signaling channel 16 which established and controls the specific structure for each system. After the data packets are processed by the M/H framing channel 16, the data packets are passed to a RF transmission system 18 which includes a channel coding unit 20 for encoding the data packets and a modulator 22 for modulating the data packets onto a carrier signal for transmission via antenna 24.

In transmitters that comply with the mobile ATSC standard, referred to as ATSC M/H, it may be necessary to perform a periodic reset of the trellis encoder, disposed in the channel coding unit 20 used with legacy broadcasting, to a known (e.g. all-zero) state. This reset is typically achieved by replacing bits entering the encoder at pre-defined positions in the bit stream with feed-back from the trellis encoder state storage. Furthermore, since the bits entering the trellis encoder first pass through the non-systematic Reed-Solomon (RS) encoder used with legacy broadcasting, this trellis encoder input replacement results in an integrity violation of the corresponding RS codewords (that was initially computed using known placeholders for the actual trellis reset bits inserted downstream). Therefore, those distorted RS codewords must be retroactively re-computed using the actual trellis reset byte values to produce new non-systematic RS parity bytes that would not cause a RS decoder in a legacy ATSC receiver to flag an error. It is necessary to perform the computations for the new RS parity byte values in a manner that permits the completion of the computation prior to final input to the legacy trellis encoder. It is therefore desirable to include an efficient encoding process and apparatus for recomputing RS codewords in conjunction with a trellis state reset condition.

SUMMARY

According to an aspect of the present disclosure, a method is provided including the steps of receiving data, the data including an information portion, a parity portion, and a synchronization portion, identifying the synchronization portion; changing a value in the synchronization portion, and computing at least one new value for the parity portion using a weighted version of the changed value in the synchronization portion.

According to another aspect of the present disclosure, an apparatus for encoding a data for transmission includes a controller that receives data, the data including an information portion, a parity portion, and a synchronization portion, wherein the controller also identifies the synchronization portion, a trellis encoder coupled to the controller that changes a value in the synchronization portion, and a parity replacer coupled to the controller and the parity replacer that computes at least one new value for the parity portion using a weighted version of the changed value in the synchronization portion.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

Figure 1:
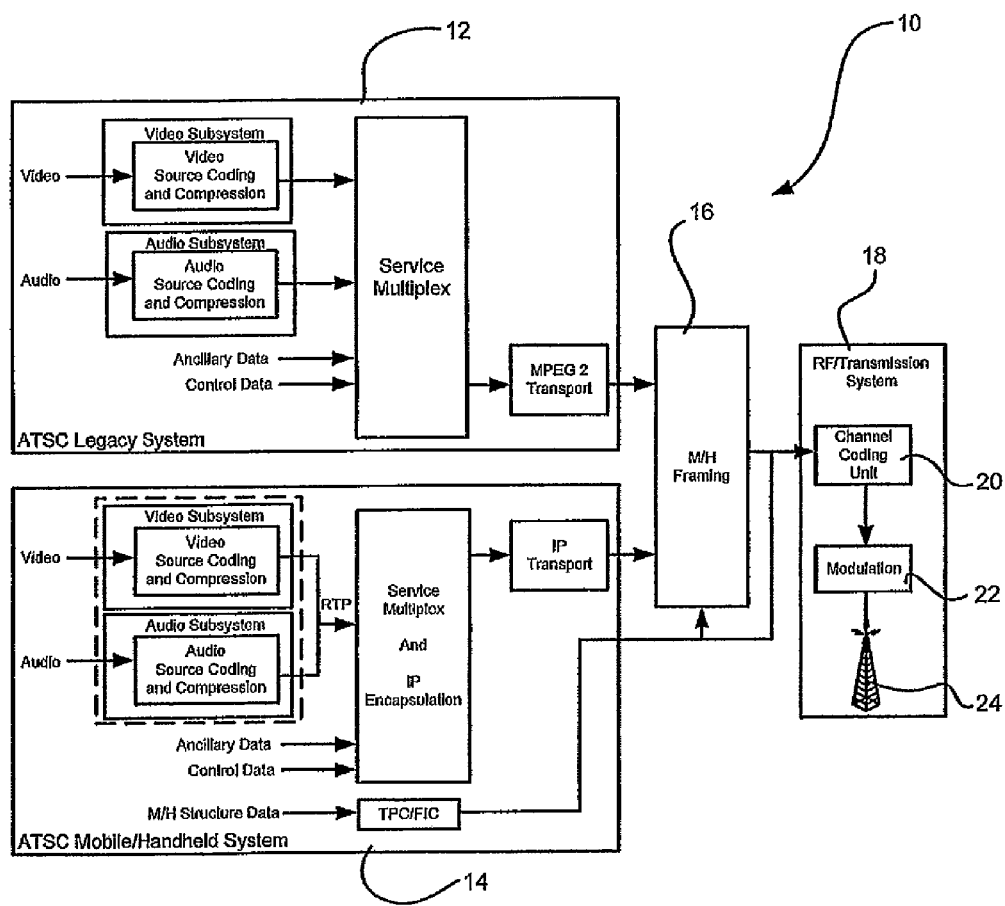
FIG. 1 is a block diagram of an ATSC (Advanced Television Standards Committee) broadcast system.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the FIGs. may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for, It is thus regarded that any means that can provide those functionalities are equivalent to those shown herein.

The present disclosure is directed at a simpler and more efficient way to replace the necessary parity values in an error encoding scheme, given that added synchronization values are modified after the parity encoding is completed. The apparatus and method of the present disclosure replace the conventional approach of simply re-encoding the entire packet of data that includes the modified synchronization values, i.e., trellis reset synchronization bytes. The apparatus and method of the present disclosure identify the various portions, or bytes, of an incoming packet in a Reed-Solomon (RS) encoded packet as either data bytes, RS parity bytes, or trellis reset synchronization bytes. The data bytes are passed through without change. The trellis reset bytes are provided to a trellis encoder to determine the new byte reset values. These new values are then stored and later retrieved when needed and used to modify the appropriate incoming parity bytes. The new incoming parity bytes are computed using the new trellis reset byte values multiplied by, or added to, a weighting value retrieved from a table stored in memory based on the location of the parity byte and the location of the trellis reset byte in the RS encoded packet.

The disclosed embodiments pertain to the emerging mobile ATSC standard, known as ATSC M/H, and further described in A/153 Part 2, The embodiments allow for a hardware-efficient and robust Reed-Solomon parity replacement scheme made necessary by the trellis encoder reset mechanism defined in the standard. The embodiments may also include features that pertain to systems other than a mobile ATSC standard, such as Wi-Fi, cellular, or other terrestrial, satellite, and wired communications systems.

Figure 2A:
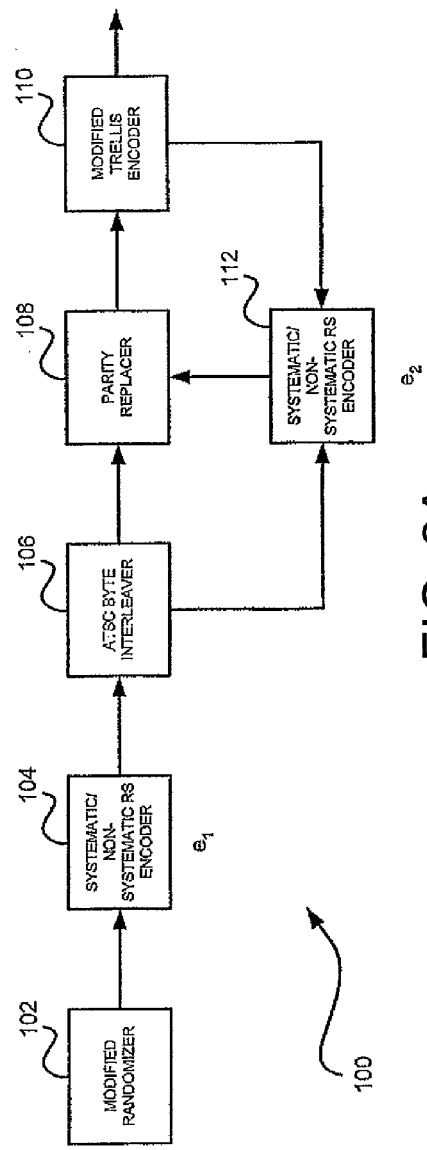
FIG. 2A is a block diagram of an embodiment of an encoder using aspects of the present disclosure.

FIG. 2 shows an embodiment for an encoder arrangement 100 used for encoding signals compliant with the ATSC M/H standard. It is to be appreciated that encoder arrangement 100 is disposed or at least partially disposed in channel coding unit 20 of FIG. 1. Furthermore, it is important to note that additional processing, primarily related to the legacy ATSC encoding and transmission, is not shown but would typically be included as part of modern broadcast equipment, as shown in FIG. 1. In FIG. 2A, the arrangement 100 includes a modified randomizer 102 for randomizing a data packet, a first systematic/non-systematic RS encoder 104 to perform an RS encoding of the data packet to add parity to the data to correct for errors occurring due to the transmission channel characteristics, an interleaver 106 for interleaving the data output from the first encoder 104, a parity replacer 108 for replacing parity bytes in the data output from the interleaver 106 and a modified trellis encoder 110 to perform trellis encoding of the data stream from the interleaver after the data stream has passed through the parity replacer 108. This RS parity re-computation necessitates either a full replication of a second non-systematic RS encoder 112 ('e2' on FIG. 2A) or a re-use of the pre-interleaver non-systematic RS encoder 104 (e1). It is important to note that the full replication is not desirable since the non-systematic RS encoder is one of the most hardware-intensive blocks of the transmitter. A re-use of the encoder 104 (e1), may require it to run at clock speeds inconsistent with the hardware platform. Additionally, the control structure needed to operate the data encoding and replacement may result in processing and control bottlenecks.

Figure 2B:
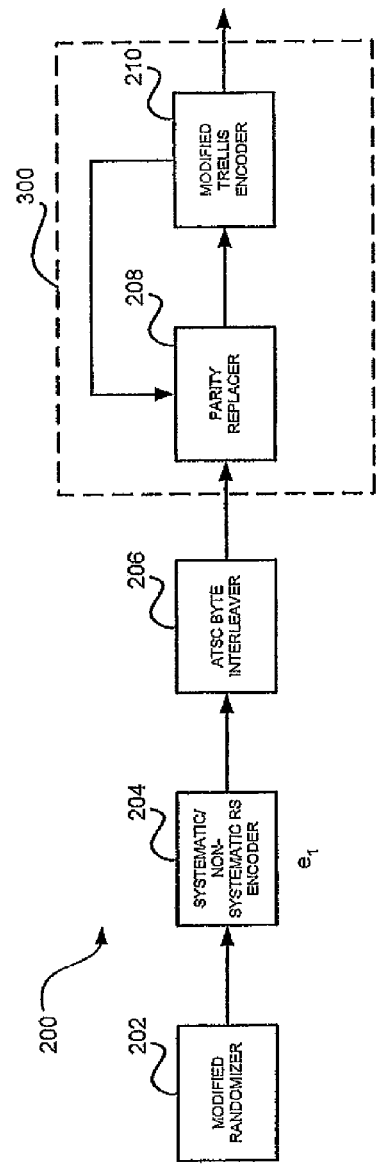
FIG. 2B is a block diagram of another embodiment of an encoder using aspects of the present disclosure.

Another embodiment for an encoder arrangement 200 is shown in FIG. 2B, where portion 300 is further explained with reference to FIG. 3. The difference with respect to the first 'brute-force' implementation in FIG. 2A is that replication (or re-use) of the second non-systematic RS encoder 112 is no longer required. In this embodiment 200, in addition to randomizer 202, RS encoder 204 and interleaver 206, only a parity replacer 208 and trellis encoder 210 are utilized. The improvement in architecture results in direct hardware savings as well as savings associated with a much simplified controlled structure.

Note for exemplary purposes, the following discussion will be based on aspects of the ATSC M/H standard and more specifically on the RS encoding and trellis byte replacement details as defined by that standard. The embodiment shown in FIG. 3 relies on the fact that the number of distinct patterns of RS parity byte locations that are affected by the trellis reset byte replacement is limited to 42 (which is the number of RS packets that contain at least one trellis reset byte). Therefore, at 20 parity bytes per packet, the total number of distinct RS byte positions to be re-computed is at most 840. Each of these bytes to be recomputed is dependent on up to 3 trellis reset bytes (there are 12 reset bytes leading 6 training sequences for a total of 72 reset bytes). Traditionally, such as in encoder 104 (e1) on FIG. 2A and as will be appreciated by those skilled in the art, non-systematic parity bytes are obtained with the use of a RS decoder with erasures. However, because of the entire 'universe' of the possible RS parity byte locations the transmitter must re-compute (i.e., 'replace') is only 840, it becomes possible to forego a real-time encoder replication as will be further explained below.

Each parity byte replacement operation may be described as follows:

$$B^{new} = B^{old} + W_1 * T_1 + W_2 * T_2 + W_3 * T_3 \quad (Eq1),$$

where: $B^{old}$ is the value of the RS parity byte (i.e. non-information-bearing or non-payload byte); $B^{new}$ is the value of the RS parity byte recomputed based on the actual values of trellis reset bytes obtained in the course of a trellis reset procedure; $T_1$, $T_2$ and $T_3$ are the new trellis reset byte values and W1, W2, W3 are weights that are only dependent on the details of the RS code as well as specific positions within the RS codeword of both trellis reset bytes and the RS parity byte being recomputed.

It is important to note that both "+" and "*" operands in Eq1 are Galois Field addition and multiplication respectively over the appropriate field and their implementation is well known to those skilled in the art.

Given the total number of parity bytes to be recomputed (i.e. 'replaced'), the number of trellis reset bytes that participate in such re-computation, may be known and are manageable. For instance, in the ATSC M/H standard there will be 1440 'W' weights, each the size of 1 byte, that need to be pre-computed and stored. One skilled in the art may use conventional techniques to compute appropriate weights for each parity byte using: 1) its position in the packet; 2) positions of trellis reset bytes in the packet; and 3) knowledge of the specific Galois Field used in the given RS code. It is important to note that storage for the 1440 'W' weights in ROM is insignificant with respect to the storage capabilities of low cost digital electronics and the requirements of storage for other portions of the design.

The simplicity of Eq1 is also made possible by the fact that placeholder values for the trellis reset bits (which make up upper nibble of every trellis reset byte) are identically '0' when they enter the non-systematic RS encoder. In one preferred embodiment as illustrated in FIG. 3, a controller 302 receives the data stream from the interleaver 206 and sorts the data stream into data bytes (i.e., an information portion), RS parity bytes (i.e., a parity portion) and trellis reset synchronization bytes (i.e., a synchronization portion). The parity bytes are sent to the on-the-fly replacer 306 while the data bytes and trellis reset synchronization bytes are sent directly to the trellis encoder 304 along with a control signal, i.e., trellis control, which identifies each byte sent so they are treated properly. The new values of trellis reset bits, as they come out of the trellis encoder 304, are stored in appropriate bit locations of bytes 'T', in storage 308, to match their positions in the original byte they have come from, while the remaining bits of bytes 'T' (i.e. the lower nibble) are set to a constant value such as '0'. Additionally, in using Eq1 unchanged and to account for the possibility that not all bytes 'T' may be needed to re-compute a given parity byte, any unused byte 'T' may be set to a constant value such as '0'. Other combinations may be possible to account for a variable number of bytes 'T'.

Figure 3:
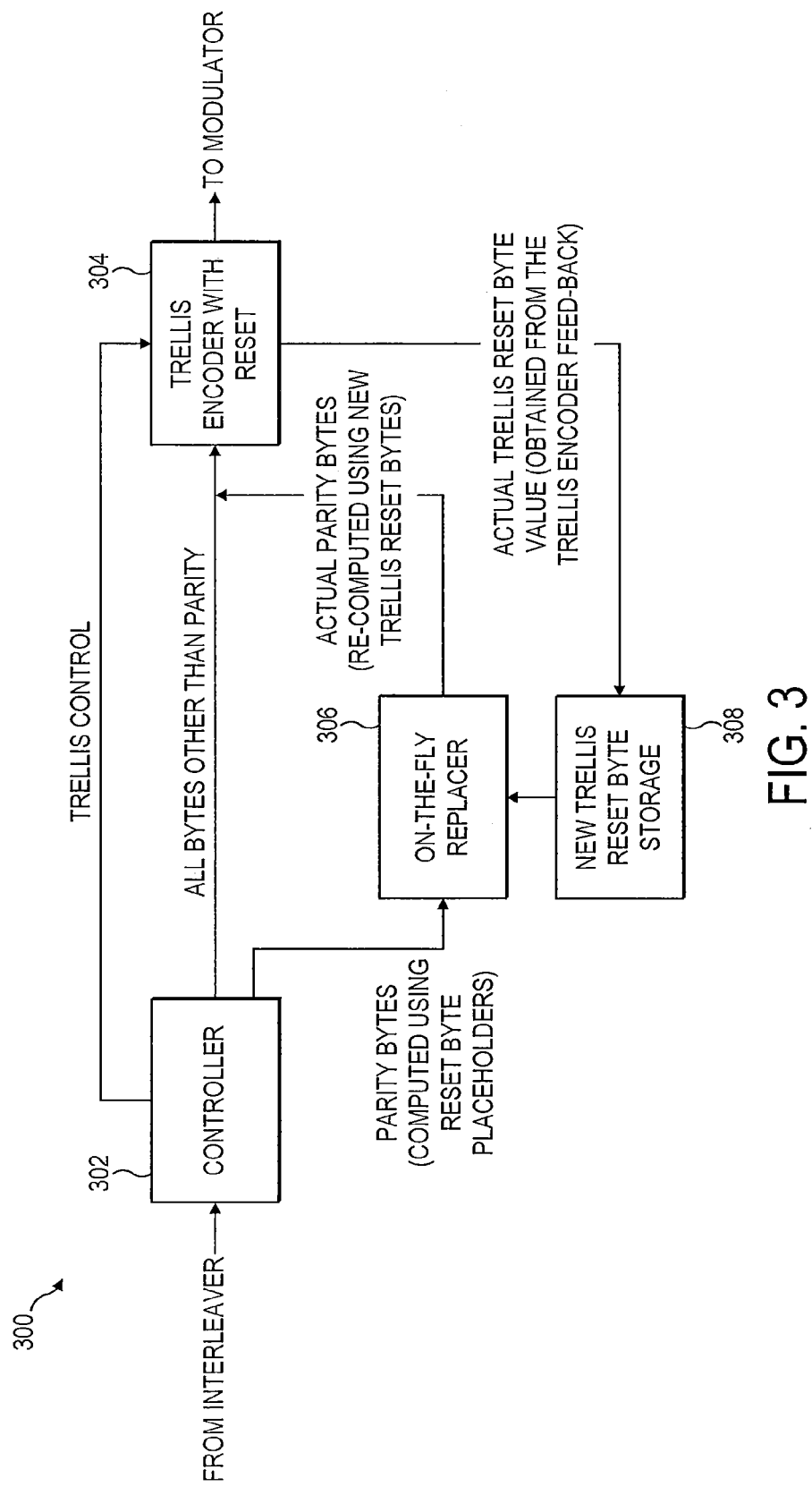
FIG. 3 is a block diagram showing in more detail a portion of the embodiment of an encoder shown in FIG. 2B using aspects of the present disclosure.

Then, once the RS parity byte to be recomputed arrives to the input of the parity replacer 306 in FIG. 3, a new value of this RS parity byte is computed from its incoming value using the pre-stored actual trellis byte values 'T' and pre-computed weights (that are best stored in a ROM table, not shown). Note that the ATSC M/H standard has been designed to give a specific time for every trellis reset byte to be computed and stored prior to the information being required for RS parity replacement computation.

It is to be appreciated that storage 308, shown in FIG. 3, may be any conventional storage or memory device known in the art. Further, the implementation of the storage or memory may include several possible embodiments, such as a single memory device or, alternatively, more than one memory circuit connected together to form a shared or common memory. Still further, the memory may be included with other circuitry, such as portions of bus communications circuitry, in a larger circuit. Finally, the storage or memory may utilize any current storage technology suitable for storing data and/or instruction code including, but not limited to, static random access memory (SRAM), read only memory (ROM), and hard disk drive.

Figure 4:
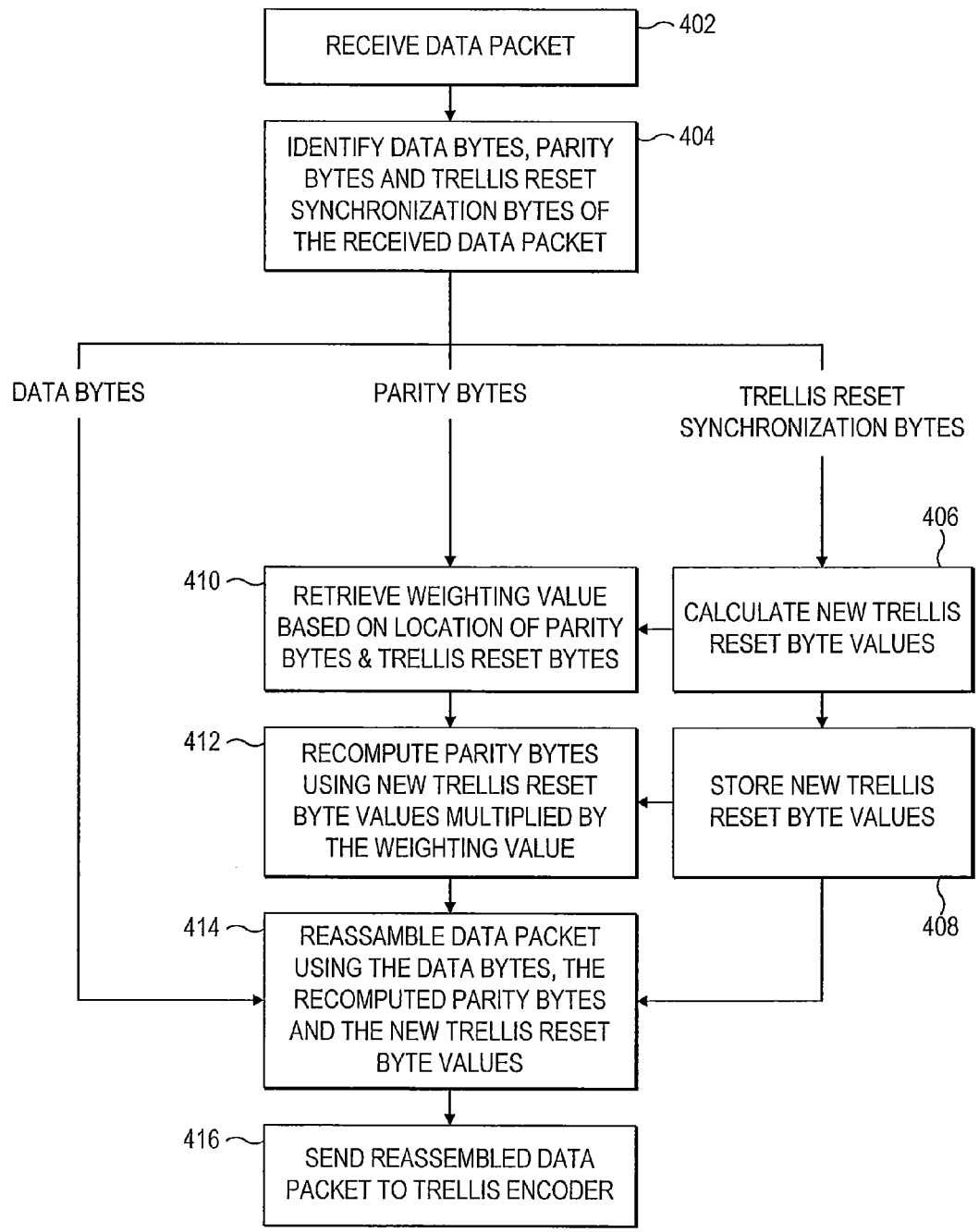
FIG. 4 is a flowchart illustrating an exemplary method for encoding a signal in accordance with the present disclosure.

The process flow of the signals shown in FIG. 3 will now be described in a process that centers around the replacement of RS parity bytes based on the equation and embodiments shown and described above. Referring to FIG. 4, a flowchart illustrating an exemplary method for encoding a signal in accordance with the present disclosure is provided. The method of FIG. 4 is primarily described in conjunction with FIG. 3. However, the method of FIG. 4 may also be used by the encoder described in FIG. 2 and may further be included with the system described in FIG. 1.

Initially at step 402, the controller 302 receives a data packet or stream from interleaver 206. In response to a signal from the ATSC interleaver 206, e.g., a M/H group start signal, the controller 302 starts using its hard-coded maps to look for trellis reset bytes and parity bytes in packets that contain reset bytes, at step 404. As trellis reset bytes are received, the controller 302 determines what pre-interleaver packet number that byte comes from and what its number within that packet is (the bytes within each packet are numbered according to the order in which they leave the interleaver). Note that there are 42 such packets, and they are numbered relative to each other, in other words, from 0 to 41. The pre-interleaver packet number, the order of the trellis reset byte within that packet and a flag indicating the trellis reset byte then travel along with the payload to the trellis encoder 304. This information is paired to payload so proper payload bytes can be retrieved when needed.

Next, at step 406, the trellis encoder 304 calculates new trellis reset byte values. The trellis encoder 304 implements the ATSC input mux, where bytes are broken into bit pairs and multiplexed according to the ATSC spec. As the bit pairs are extracted from bytes, a signal indicates the number of each bit pair within the byte it has come from. In addition, a signal goes from the trellis encoder 304 to the controller 302 indicating the 2 MSB (most significant bit) pairs of a trellis reset byte that actually cause the trellis encoder to reset.

All of the above-described control signals are routed through the controller 302 onto the parity replacer 306. Those bit pairs that are replaced with the trellis encoder register contents in response to the trellis reset, are put in place of the original bit pairs and travel in sync with the aforementioned control signals.

At step 408, the trellis reset bit pairs are stored into a register array, i.e., new trellis reset byte storage 308. Each bit pair is placed into a byte location indicated by the signals created above, thus correctly re-constituting the trellis reset bytes that were previously broken up. Each byte itself, in turn, is stored into one of the 72 array location according to its pre-interleaver packet number from 0 to 42 and its order in that packet from 0 to 2.

By the time a parity byte is received at the controller 302, the trellis reset bytes that are required for its re-computation are guaranteed to be available. It is to be appreciated that not all of the parity bytes are changed but are only changed as needed—the parity bytes not changed are treated as payload. As such parity bytes are received, the controller 302 determines what 0 to 41 pre-interleaver packet number that byte comes from and what its 0 to 19 number within that packet is (the bytes within each packet are numbered according to the order in which they leave the interleaver). When such parity byte to be recalculated (or replaced) is received, the aforementioned control signals along with the byte itself and an indicator flag are forwarded to the parity replacer 306, where the previously stored new values of the trellis reset bytes are now available along with the hard-coded weighting factors (as shown in Eq1) needed for parity byte recalculation. An additional signal also is sent to the parity replacer 306 along with the data. This signal indicates the number of trellis reset bytes (and hence weights) to be used in re-calculation of a particular byte (if the number is less than 3, the unused values in the equation are replaced with zero-bytes). This number equals the number of trellis reset bytes received for the given packet before the first parity byte from that packet is received. At step 410, the parity replacer 306 retrieves the appropriate weighing factor or value based on the location of the parity bytes and the trellis reset bytes. Next, at step 412, the parity replacer 306 recomputes the parity bytes according to Eq1 above.

Once that calculation takes place, the re-calculated byte values are sent back to the controller 302 along with a matching flag. These new values then replace the original parity byte values before being sent on to the trellis encoder 304, the replacement made possible by the use of a matching delay through which all of the data leaving the controller 302 has to travel. At step 414, the data packet is reassembled using the data bytes, the recomputed parity bytes and the new trellis reset byte values. The reassembled data packet is then sent to the trellis encoder 304, at step 416.

As a result of the present embodiments, a trellis reset and RS parity byte replacement apparatus and method will permit completion of the parity re-computation prior to final input to the legacy trellis encoder.

An apparatus and method for encoding a signal are provided. The apparatus and method of the present disclosure are directed at a simpler and more efficient way to replace the necessary parity values in an error encoding scheme, given that some portion of the data stream is modified after the initial parity computation is completed. The apparatus and method of the present disclosure identify the various portions, or bytes, of an incoming packet in a Reed-Solomon (RS) encoded packet as either data bytes, RS parity bytes, or trellis reset synchronization bytes. The data bytes are passed through without change. The trellis reset bytes are provided to a trellis encoder to determine the new byte reset values. These new values are then stored and later retrieved when needed and used to modify the appropriate incoming parity bytes. The new incoming parity bytes are computed using the new trellis reset byte values multiplied by, or added to, a weighting value retrieved from a table stored in memory based on the location of the parity byte and the location of the trellis reset byte in the RS encoded packet.

According to an aspect of the present disclosure, a method is provided including the steps of receiving data, the data including an information portion, a parity portion, and a synchronization portion, identifying the synchronization portion; changing a value in the synchronization portion, and computing at least one new value for the parity portion using a weighted version of the changed value in the synchronization portion.

In one aspect, the identifying step further includes identifying the information portion and parity portion and determining location information for the information portion, the parity portion and the synchronization portion in the received data. In another aspect, the changing step includes generating new values for the synchronization portion and storing the new values of the synchronization portion to match their original locations in the received data.

In a further aspect of the method, the computing step includes retrieving a weighting value for at least one new value of the synchronization portion, the weighting value being based on a location of the parity value in the received data and a location of the changed value in the synchronization portion in the received data and recomputing the at least one value of the parity portion using the new value of the synchronization portion and the retrieved weighting value. In yet another aspect, the method further includes reassembling the data using the information portion, the computed at least one new value for the parity portion and the new values of the synchronization portion.

According to another aspect of the present disclosure, an apparatus for encoding a data for transmission includes a controller for receiving data, the data including an information portion, a parity portion, and a synchronization portion, wherein the controller identifies the synchronization portion, a trellis encoder for changing a value in the synchronization portion, and a parity replacer for computing at least one new value for the parity portion using a weighted version of the changed value in the synchronization portion.

In another aspect, the weighted version of the changed value in the synchronization portion is based on a location of the parity portion in the received data, a location of synchronization portion in the received data and the changed value in the synchronization portion.

Although embodiments which incorporate the teachings of the present disclosure have been shown and described in detail herein, those skilled in the art can readily devise many other varied embodiments that still incorporate these teachings. Having described preferred embodiments of an apparatus and method for encoding a signal (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method comprising the steps of:
   receiving data, the data including an information portion, a parity portion, and a synchronization portion;
   identifying the synchronization portion;
   changing a value in the synchronization portion; and
   computing at least one new value for the parity portion using a weighted version of the changed value in the synchronization portion, wherein the weighted version of the changed value in the synchronization portion is based on a location of the parity portion in the received data, a location of synchronization portion in the received data and the changed value in the synchronization portion.

2. The method as in claim 1, further comprising the step of replacing the computed at least one new value for the parity portion in the received data.

3. The method as in claim 1, wherein the step of identifying includes:
   identifying the information portion and parity portion; and
   determining location information for the information portion, the parity portion and the synchronization portion in the received data.

4. The method as in claim 3, wherein the step of changing includes:
   generating new values for the synchronization portion; and
   storing the new values of the synchronization portion to match their original locations in the received data.

5. The method as in claim 4, wherein unused bytes of the synchronization portion are set to zero.

6. The method as in claim 5, wherein the step of computing includes:
   retrieving a weighting value for at least one new value of the synchronization portion, the weighting value being based on a location of the parity value in the received data and a location of the changed value in the synchronization portion in the received data; and
   recomputing the at least one value of the parity portion using the new value of the synchronization portion and the retrieved weighting value.

7. The method as in claim 6, further comprising the step of reassembling the data using the information portion, the computed at least one new value for the parity portion and the new values of the synchronization portion.

8. The method as in claim 7, wherein the information portion remains unchanged.

9. The method as in claim 7, wherein the step of reassembling the data includes replacing only a portion of the parity portion.

10. An apparatus for encoding a data for transmission comprising:
    a controller that receives data, the data including an information portion, a parity portion, and a synchronization portion, the controller also identifying the synchronization portion;
    a trellis encoder coupled to the controller, the trellis encoder changing a value in the synchronization portion; and
    a parity replacer coupled to the controller and the trellis encoder, the parity replacer computing at least one new value for the parity portion using a weighted version of the changed value in the synchronization portion,
    wherein the weighted version of the changed value in the synchronization portion is based on a location of the parity portion in the received data, a location of synchronization portion in the received data and the changed value in the synchronization portion.

11. The apparatus as in claim 10, wherein the parity replacer replaces the computed at least one new value for the parity portion in the received data.

12. The apparatus as in claim 10, wherein the controller identifies the information portion and parity portion and determines location information for the information portion, the parity portion and the synchronization portion in the received data.

13. The apparatus as in claim 12, wherein upon being reset, the trellis encoder generates new values of the synchronization portion and stores the new values in a storage device to match their original locations in the received data.

14. The apparatus as in claim 13, wherein unused bytes of the synchronization portion are set to zero.

15. The apparatus as in claim 14, wherein the parity replacer retrieves a weighting value for at least one new value of the synchronization portion, the weighting value being based on a location of the parity value in the received data and a location of the changed value in the synchronization portion in the received data and recomputes the at least one value of the parity portion using the new value of the synchronization portion and the retrieved weighting value.

16. The apparatus as in claim 15, wherein the controller reassembles the data using the information portion, the computed at least one new value for the parity portion and the new values of the synchronization portion.

17. The apparatus as in claim 16, wherein the information portion remains unchanged.

18. The apparatus as in claim 16, wherein the controller replaces only a portion of the parity portion.

19. An apparatus for encoding a data for transmission comprising:
    means for receiving data the data including an information portion, a parity portion, and a synchronization portion;
    means for identifying the synchronization portion;
    means for changing a value in the synchronization portion; and means for computing a new value for the parity portion using a weighted version of the changed value in the synchronization portion, wherein the weighted version of the changed value in the synchronization portion is based on a location of the parity portion in the received data, a location of synchronization portion in the received data and the changed value in the synchronization portion.

* * * * *